Nov. 6, 1956

N. W. EUREY 2,769,568

TRUCK WITH FALSE MOVABLE BOTTOM

Filed April 6, 1953

INVENTOR:
NOAH W. EUREY

BY Eaton & Bell

ATTORNEYS.

Nov. 6, 1956
N. W. EUREY
2,769,568
TRUCK WITH FALSE MOVABLE BOTTOM
Filed April 6, 1953
3 Sheets-Sheet 2
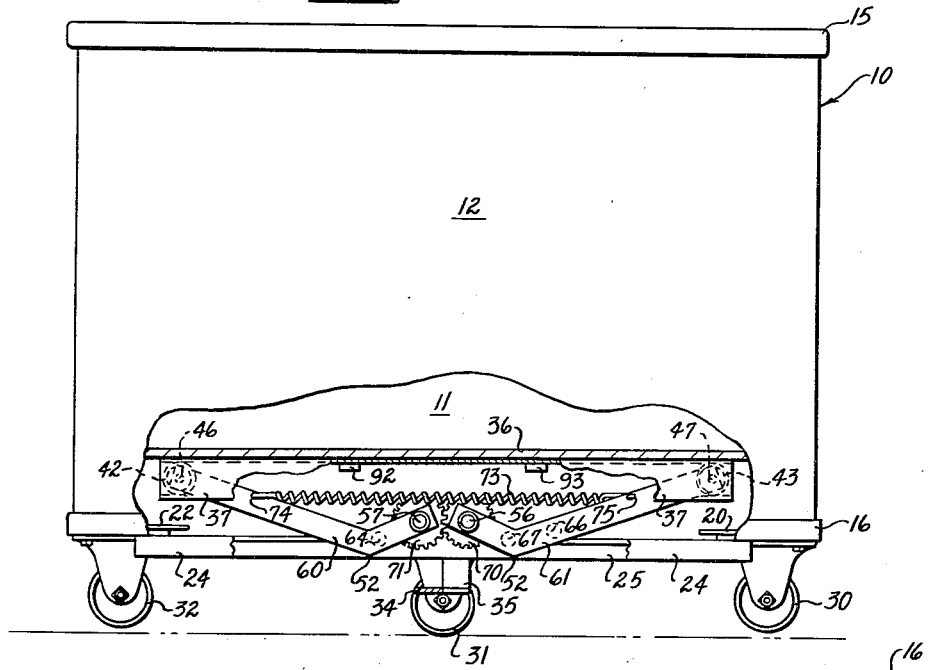
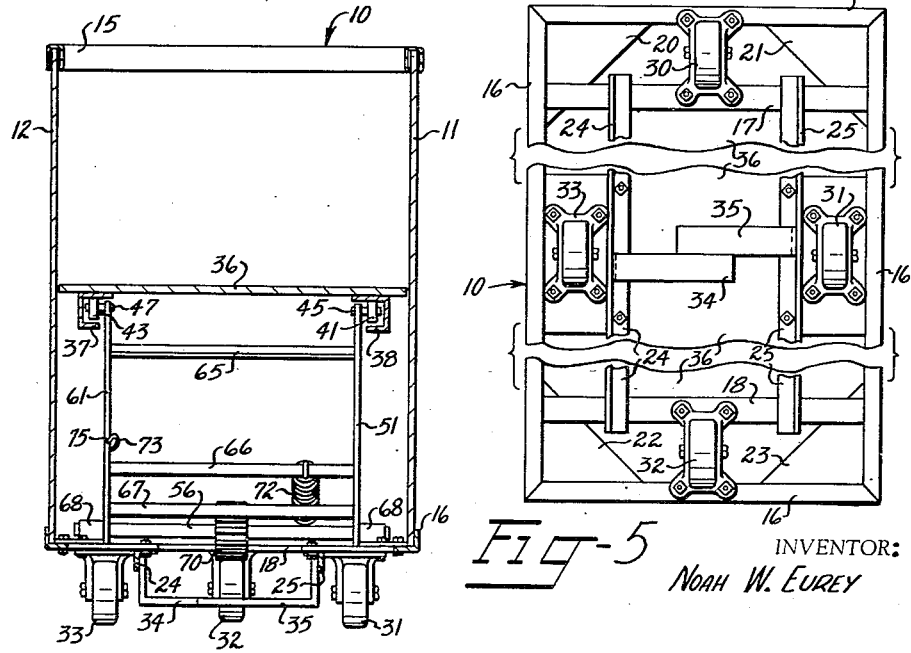
INVENTOR:
NOAH W. EUREY
BY Eaton & Bell
ATTORNEYS.

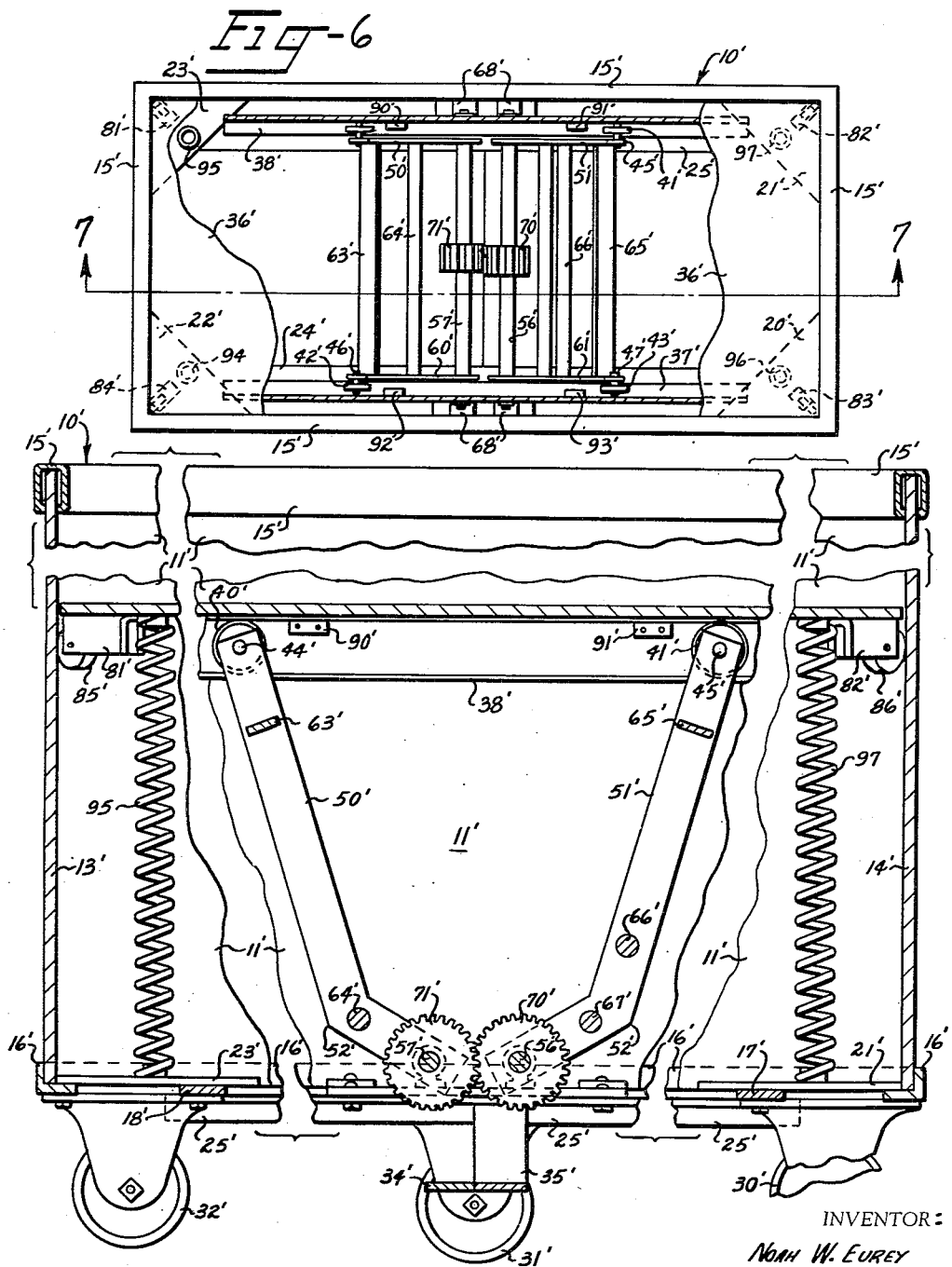

United States Patent Office 2,769,568
Patented Nov. 6, 1956

2,769,568

TRUCK WITH FALSE MOVABLE BOTTOM

Noah W. Eurey, Lincolnton, N. C., assignor to Excel Textile Supply Company, a partnership Application April 6, 1953, Serial No. 347,097

7 Claims. (Cl. 220—93)

This invention relates to hand trucks and more especially to that type of hand truck which is provided with a false movable bottom particularly useful in holding bobbins or the like.

The desirability of providing a bobbin truck having a false movable bottom which is adapted to automatically elevate or depress depending upon the weight of the load on the movable bottom, has long been recognized, and in the past many attempts have been made to provide such a truck in an effort to obviate the necessity of constantly stooping over to reach articles in the bottom of an ordinary truck. Little success has been attained, however, in providing a truck with a false movable bottom which will not bind or tilt when weight is unevenly distributed over the bottom, and those structures seeking this end have involved complicated mechanisms requiring numerous and expensive component parts which have proved impractical to manufacture.

It is therefore an object of this invention to provide a hand truck having a false movable bottom, which bottom will at all times maintain the top surface of the cargo therein at a constant elevation conveniently accessible to an operator, and which bottom will not bind as it automatically elevates or depresses regardless of the distribution of the weight thereon, and which truck consists of simple inexpensive parts and is therefore capable of being cheaply and easily manufactured.

It is a further object of this invention to provide a hand truck with a false movable bottom, said truck having rectangular spaced side walls, an open top, and an open frame bottom with conventional wheels attached to the under side thereof, and a false movable bottom being supported at only a single point by said open frame bottom.

Some of the objects of the invention having been stated, other objects will appear as the description proceeds, when taken in connection with the accompanying drawings in which—

Figure 1 is a top plan view of the bobbin truck, with parts of the movable false bottom broken away to show the construction of the moving parts;

Figure 2 is an enlarged, partially exploded, vertical sectional view taken along the line 2—2 in Figure 1;

Figure 3 is a vertical sectional view taken along the line 3—3 in Figure 1;

Figure 4 is a side elevation of the truck with a portion of the side broken away showing the false movable bottom in lowered position;

Figure 5 is an inverted plan view showing details of the construction of the base of the truck;

Figure 6 is a top plan view similar to Figure 1 but showing a modified form of the invention in which vertical springs may be used;

Figure 7 is an enlarged vertical sectional view similar to Figure 2, but showing two of the vertical springs used in the modified form of the invention.

Referring more specifically to the drawings, the numeral 10 broadly indicates a hand truck which may be of any suitable and convenient shape but which is preferably rectangular and has suitable spaced interconnected side walls 11, 12, 13 and 14 which walls may be formed of any suitable material such as wood, metal or the like. Extending around the periphery of the uppermost surfaces of the side walls 11, 12, 13 and 14 is a channel-shaped rim 15 which serves to hold said walls 11, 12, 13 and 14 in proper spaced relation and protects the upper edge thereof.

The side walls of the hand truck are supported by an open framework comprising a rectangularly-shaped angle iron frame 16, which extends around the outer periphery of the truck and to which the lower ends of the side walls 11, 12, 13 and 14 are suitably secured. Extending transversely of the truck and affixed to the rectangularly-shaped frame 16 adjacent opposite ends thereof are suitable frame members 17 and 18. Each corner of the rectangularly-shaped frame 16 is reinforced by gussets 20, 21, 22 and 23. Extending longitudinally of the truck in spaced parallel relation are two frame members 24 and 25, opposite ends of which attached to the respective transversely extending frame members 17 and 18 by any suitable means.

Suitable wheels or casters 30, 31, 32 and 33 are provided, said wheels being attached by any suitable means to the bottom frame members, and being so disposed that the two centermost wheels are disposed at a lower elevation than are the end wheels in order to facilitate manipulation of the truck. Extending from frame member 24 toward the center of the truck, is a frame member 34, which together with a like frame member 35 extending toward the center of the truck from the longitudinally extending frame member 25, is adapted to protect the mechanism which operates a rectangular false movable bottom 36 disposed within the confines of the walls 11, 12, 13 and 14.

The upper surface of the false movable bottom 36 is composed of any suitable material such as wood, sheet metal, plastic or the like. Suitably secured to the under surface of the false movable bottom 36 are a pair of longitudinally extending channel-shaped trackways 37 and 38. Disposed within the trackways 37 and 38 are rollers 40, 41, 42 and 43, each of said rollers 40, 41, 42 and 43 having a shaft 44, 45, 46 and 47, respectively, suitably journaled therein. The outermost ends of the shafts 44, 45, 46 and 47 are journaled within respective rollers 40, 41, 42 and 43 while the inner ends of the shafts 44, 45, 46 and 47 are journaled respectively in downwardly depending members or supporting arms 50, 51 and 60, 61.

The downwardly depending members 50 and 51 converge inwardly, as do the members 60, 61 and the lower portions of the same are bent sharply toward each other as at 52. The members 60, 61 also converge inwardly and are constructed in an identical manner. The members 50, 51, 60 and 61 and associated parts act in a manner similar to lazy tongs in controlling movement of the false bottom 36.

The arms 50 and 60 are rigidly secured together by means of a bar 63 adjacent the upper extremities thereof, a bracing rod 64 adjacent the angle 52 and by a base member embodied in the drawings as a rod or shaft 57 at the lower portions thereof. The arms 51 and 61 are secured together in a like manner by a bar 65 securing the same together adjacent the upper extremities thereof, a bar 66 disposed slightly above the angle 52, a similar rod or bar 67 disposed immediately below the angle 52, and by another base member embodied in the drawings as a rod or shaft 56 which secures the extreme lower portion of the arms 51 and 61 together. Each of the bracing members 62, 63, 64, 65, 66 and 67 just described, is rigidly secured to each of the arms 50, 51, 60 and 61.

The shafts 56 and 57 extend outwardly beyond the members 50, 51, 60 and 61 and are journaled in the bearing blocks 68 fixed on the frame 16. Fixedly mounted on the medial portion of the shaft 56 is a spur gear 70, the teeth of which are adapted to intermesh with corresponding teeth on a spur gear 71 fixedly mounted in a like manner on the shaft 57. Thus, any movement of that portion of the false movable bottom 36 suppored by the shaft 56 will result in corresponding movement of that portion of the bottom 36 supported by the shaft 57, and thus eliminate any tendency to bind or tilt. It will be noted that the spur gears 70 and 71 are alined relative to the longitudinal direction of the truck. Springs 72 and 73 normally urge the two pair of upwardly diverging arms 50, 60 and 51, 61 inwardly toward each other, said spring 72 being secured at one end to the rod or bracing member 64, and at the other end to the bracing member or rod 66. Opposite ends of the spring 73, however, are connected directly to the arm 60 and the arm 61 at 74 and 75 so as to normally urge the same inwardly toward each other.

Suitably secured to the under surface of the movable bottom 36 at the four corners thereof are short channel shaped members 80, 81, 82 and 83 having respective rollers 84, 85, 86 and 87, journaled therein and rotatably engaging the corner portions of the side members 11, 12, 13, and 14 so as to act as guide members for the movable false bottom 36 as the same is elevated and depressed.

As the truck 10 is loaded with bobbins or other cargo the false movable bottom 36 is depressed as the weight of the cargo increases so that eventually the false movable bottom 36 will occupy the position shown in Figure 4, while the top of the cargo will maintain a constant elevation which is at all times convenient to handling by the operator.

Referring now to Figure 2 it will be observed that the false movable bottom 36 is almost at its extreme elevation. As increased weight is placed upon the upper surface of the bottom 36 such weight will cause the springs 72 and 73 to become extended as the gears 70 and 71 rotate in engagement with each other. As weight is removed from the surface of the false bottom 36, tension is correspondingly removed from the springs 72 and 73 so that the two springs 72 and 73 contract and in so doing urge the arms 50, 51 and 60, 61 inwardly toward each other thus resulting in the raising of the false bottom 36 as the weight decreases. It will be noticed that the entire weight of the cargo is centered upon the shafts 56 and 57 upon which are mounted intermeshing gears 70 and 71. Thus, although the weight may be deposited entirely on one side of the truck 10 the weight will be as equally dstributed as though it had been placed in the center of the false bottom 36. The rollers 84, 85, 86 and 87 are extremely efficient guide members inasmuch as friction is reduced to a minimum by virtue of the elimination of sliding contact between the bottom 36 and the side walls 11, 12, 13 and 14.

Obviously, the tension of the springs 72 and 73 must be predetermined with relation to the cargo to be handled. Suitable blocks 90, 91, 92 and 93 are provided within the confines of the trackways 37 and 38 in order to prevent the rollers 40, 41, and 42, 43 from coming together when the false bottom 36 has reached a predetermined elevation.

*Modified form*

Referring to Figures 6 and 7 there will be observed a slightly modified form of truck wherein like parts will bear like reference characters with the prime notation added and only the modification will be described. It will be observed that the supporting arrangement for the false movable bottom 36′ may, if desired, be used in conjunction with a plurality of vertically extending compression springs 94, 95, 96 and 97. These vertical springs may be used in lieu of the springs 72 and 73 previously described.

Each of the springs 94, 95, 96 and 97 is secured at its lower end to respective gussets 20′, 21′, 22′ and 23′, and is secured at its upper end to the under surface of the false movable bottom 36′. It will be observed in Figure 6 that each of the channel-shaped members 80′, 81′, 82′ and 83′ is substantially shortened in the modified form in order to provide ample space to position the upper ends of the vertical springs 94, 95, 96 and 97 adjacent thereto.

It is thus seen that I have provided a simple compact mechanism for automatically elevating and depressing a false movable bottom within a truck so as to maintain the topmost surface of the truck's cargo at a constant convenient elevation and thus facilitating handling of said cargo. The combination of the lazy tong and gear arrangement together with the resilient means completely eliminates the disadvantage of having the false movable bottom bind against the side walls of the truck due to uneven distribution of weight upon the false movable bottom.

In the drawings and specification there has been set forth a preferred embodiment of the invention and although specific terms are employed, they are used in a generic and descriptive sense only, and not for purposes of limitation, the scope of the invention being defined in the claims.

I claim:
1. In a hand truck having a wheeled frame, side walls and a vertically movable false bottom, the combination of means for controlling the movement of said bottom and maintaining it level upon variation in the weight of articles such as bobbins placed thereon comprising a pair of parallel shafts rotatably mounted on said frame, intermeshing gears fixed on said shafts, a first pair of parallel arms fixedly connected at their lower ends to one of said shafts in perpendicular relation thereto and extending upwardly and outwardly at an angle to a vertical plane containing the longitudinal axis of said shaft, a second pair of parallel arms fixedly connected at their lower ends to the other of said shafts in perpendicular relation thereto and extending upwardly and outwardly from said shaft in diverging relation to said first arms, rollers rotatably mounted on the upper ends of said arms, a pair of spaced trackways on the under surface of said movable bottom, said rollers being rotatably mounted within said trackways, resilient tension means connecting said first pair of arms to said second pair of arms and normally urging the same together, and said first and second pairs of arms being movable apart from each other under tension upon weight being placed upon the movable bottom.

2. In a truck having a wheeled frame, side walls and a vertically movable false bottom, the combination of an improved supporting structure for said vertically movable false bottom comprising a first group of rollers mounted on said vertically movable false bottom in engagement with said side walls, a pair of parallel shafts rotatably mounted on said wheeled frame, means connecting said shafts causing simultaneous rotation of the same in opposite directions, at least one pair of upwardly diverging rigid indeformable supporting arms extending between said rotatable shafts and the under surface of said false movable bottom, the lower end of one of said arms being secured in perpendicular relation to one of said shafts and the lower end of the other of said arms being secured in perpendicular relation to the other of said shafts, said arms diverging upwardly and outwardly away from said shafts and at equal angles away from a vertical plane parallel to and between the two shafts, a second group of rollers on the upper ends of said arms engageable with the under surface of said vertically movable bottom, resilient means normally urging the upper ends of said arms toward each other to elevate said movable bottom, and said resilient means and said shafts being responsive to weight positioned on the movable bottom to cause said arms to move apart for depressing the movable bottom.

3. In an open top hand truck having a wheeled frame, spaced side walls and a false vertically movable bottom, the combination of means for automatically depressing and elevating said false bottom within the confines of said side walls in direct relation to the amount of weight placed on said false bottom comprising a pair of parallel shafts rotatably mounted on said frame, means connecting said shafts causing simultaneous rotation of the same in opposite directions, a pair of spaced trackways on the under surface of said bottom, first and second groups of upwardly diverging rigid supporting arms, the arms in said first group being in the same plane and the lower ends of said first group of arms being fixed in perpendicular relation to one of said shafts, the arms in said second group being in the same plane and the lower ends of said second group of arms being fixed in perpendicular relation to the other of said shafts, the said planes of the first and second groups of arms diverging upwardly and outwardly away from said shafts and at equal angles away from a vertical plane parallel to and between the two shafts, rollers mounted on the upper ends of said supporting arms in rotatable engagement with said trackways, means for maintaining said rollers in engagement with said trackways, said arms defining indeformable supports for said bottom, said first and second groups of arms being movable away from each other to permit depression of said bottom in response to a predetermined amount of weight being placed thereon, and resilient means normally urging said first and second groups of arms together to elevate said bottom.

4. In a bobbin truck having a wheeled frame, side walls and a vertically movable false bottom, the combination of means for maintaining said false bottom in a constant predetermined attitude relative to said side walls and for causing vertical movement of said bottom in response to variation in the amount of weight placed thereon, said means comprising a pair of transverse parallel shafts rotatably mounted on said frame intermediate the ends thereof, means connecting said shafts causing simultaneous rotation of the same in opposite directions, a first pair of transversely spaced rigid parallel arms fixed at their lower ends to one of said shafts in perpendicular relation thereto and extending upwardly and outwardly at an angle from said shaft, a second pair of transversely spaced rigid parallel arms fixed at their lower ends to the other of said shafts in perpendicular relation thereto and extending upwardly and outwardly from said shaft, said first and second pairs of arms diverging upwardly and outwardly at equal angles away from a vertical plane parallel to and between the two shafts, a first group of rollers rotatably mounted on the upper ends of said arms, a pair of spaced parallel longitudinally extending trackways on the under surface of said movable bottom, means for permitting longitudinal movement of said rollers along said trackways and otherwise preventing relative movement between said rollers and said trackways, stops limiting longitudinal movement of said rollers relative to said trackways beyond predetermined points, resilient tension means extending between said first and second pairs of arms and normally urging the same together, said first and second pairs of arms being movable apart from each other under tension upon weight being placed upon the movable bottom, and a second group of rollers rotatably mounted on said movable bottom in engagement with the side walls of said truck.

5. In a bobbin truck having a wheeled frame, side walls and a vertically movable false bottom, the combination of means for constantly maintaining said bottom in a horizontal attitude and for controlling the vertical movement of said bottom in response to variation in the weight of articles placed thereon, said means comprising a pair of parallel shafts rotatably mounted on said wheeled frame, means connecting said shafts causing simultaneous rotation of the same in opposite directions, a pair of upwardly diverging indeformable arms, each of said arms being connected at its lower end to one of said shafts in perpendicular relation thereto and said upwardly diverging arms extending upwardly and outwardly from their respective shafts at equal angles to vertical planes containing the longitudinal axis of said shafts, rollers on the upper ends of said arms rotatably engaging the movable bottom and confined against vertical movement relative thereto, a plurality of compression springs extending between said movable bottom and the wheeled frame, and anti-friction means disposed between said vertically movable false bottom and said side walls.

6. In a truck having a frame and a vertically movable false bottom, the combination of an improved supporting structure for said vertically movable false bottom comprising a pair of parallel shafts rotatably mounted on said frame, intermeshing gears fixed on said shafts, supporting members extending between said shafts and said false bottom, said supporting members being supported by said parallel shafts and the supporting members diverging upwardly and outwardly away from said shafts and at equal angles away from a vertical plane parallel to and between the shafts, resilient means normally urging said false bottom upwardly, means slidably connecting the upper ends of the supporting members to the false bottom, the upper ends of said supporting members being movable toward and away from each other respectively as the false bottom is elevated and depressed in accordance with variations in weight placed thereon, and stop means limiting inward movement of the supporting members toward each other beyond a predetermined point whereby the false bottom is caused to move through successive parallel planes without tilting.

7. A structure according to claim 6 wherein the supporting members are of angular configuration and are so arranged relative to each other that their upper end portions diverge upwardly and outwardly from each other to a lesser extent than their lower end portions.

References Cited in the file of this patent

UNITED STATES PATENTS

| | | |
|---|---|---|
| 29,751 | Allen | Aug. 28, 1860 |
| 575,684 | Baxter | Jan. 26, 1897 |
| 773,721 | Duvall | Nov. 1, 1904 |
| 904,613 | Hatt | Nov. 24, 1908 |
| 1,161,694 | La Brade | Nov. 23, 1915 |
| 1,849,348 | Davis | Mar. 15, 1932 |
| 2,002,572 | Forbes et al. | May 28, 1935 |
| 2,284,531 | Miller et al. | May 26, 1942 |
| 2,446,485 | McMichael | Aug. 3, 1948 |
| 2,599,296 | Toomey et al. | June 3, 1952 |